Patented Aug. 21, 1934

1,970,912

UNITED STATES PATENT OFFICE 1,970,912

OIL-SOLUBLE RESIN

Kenneth M. Irey, New Brunswick, N. J., assignor to Resinox Corporation, New York, N. Y., a corporation of Delaware No Drawing. Application October 29, 1931, Serial No. 571,865

11 Claims. (Cl. 260—4)

The present invention pertains to phenol-ketone-aldehyde resins. More particularly, it pertains to improved phenol-ketone-aldehyde resins which are soluble in the customary drying oils such as China wood oil.

It is well known that in the past methods have been disclosed for the production of resinous condensation products from phenols, ketones and aldehydes. The products resulting from these previously known processes, while possessing many desirable properties, are entirely unsuited for certain purposes, such as the production of oil varnishes, due to the fact that such materials are relatively insoluble in drying oils. The new products prepared by the method hereinafter set forth have the property of being substantially oil soluble. In addition, they possess other properties which make them suited for many other uses for which synthetic resins are ordinary used. Such uses will be obvious from their properties to those skilled in the art.

The new resins herein disclosed and claimed are made in two, or more, steps: Suitable proportions of a phenol (1 mol) and a ketone (1 mol) are reacted in the presence of a catalyst such as hydrochloric acid. At the conclusion of the reaction, the excess reactants and the acid used as catalyst are removed by any suitable means. For example, the hydrochloric acid may be neutralized by means of a caustic soda solution and the resulting sodium chloride solution removed. The unreacted starting materials may then be removed by steam distillation. Any bis-[hydroxy-aryl]-dialkyl methane such as bis-[4-hydroxy-aryl]-dialkyl methane formed during the reaction may be separated from the bis-[hydroxy-aryl]-dialkyl methane — ketone condensation product such as bis-[4-hydroxy-aryl]-dialkyl methane—ketone condensation product by taking advantage of the latter compound's solubility in benzol or toluol.

If preferred, the bis-[4-hydroxy-aryl]-dialkyl methane may first be prepared by reacting 3 mols of a phenol with 1 mol of a keton, following the same general operation conditions just outlined. One mol of the resulting bis-[4-hydroxy-aryl]-dialkyl methane may then be reacted with one mol of ketone to give the desired bis-[4-hydroxy-aryl]-dialkyl methane — ketone condensation product.

The bis-[4-hydroxy-aryl]-dialkyl methane—ketone condensation product, obtained by either of the procedures just outlined, is next treated with an aldehyde in the presence of an acid or alkaline catalyst, but preferably in the absence of any catalyst whatsoever.

The following specific example will serve to illustrate a preferred method of carrying out the reaction outlined above: 1 mol of acetone is first reacted with 1 mol of phenol in the presence of hydrochloric acid (5–6% based on the weight of the phenol) as catalyst at a temperature of approximately 70–80° C. for a period of about 48 hours. The product thus obtained is next steam distilled at a temperature of approximately 160–180° C. until any excess of phenol and hydrochloric acid is removed, during which operation the color of the residue generally becomes somewhat lighter. If desired, the hydrochloric acid may be neutralized with caustic solution and the aqueous solution of sodium chloride removed before distillation. The bis-[4-hydroxyl-phenyl]-dialkyl methane—ketone condensation product thus produced is a reddish colored material with a melting point around 50° C., soluble in the usual solvents such as acetone, benzol, toluol, etc.

The beta-beta-bis-[4-hydroxy-phenyl]-propane—acetone condensation product may also, if desired, be prepared by following a different procedure. For example, the ratio of reactants in the example cited above may be changed so to employ 3 mols of phenol to 1 mol of acetone. The beta-beta-bis-[4-hydroxy-phenyl]-propane obtained in this manner may then be reacted with an additional mol of acetone in the presence of hydrochloric acid as catalyst, to give beta-beta-bis-[4-hydroxy-phenyl]-propane—acetone condensation product. The product formed in this manner, however, is generally rather dark in color and therefore not as suitable for many purposes as the material produced by the method first outlined.

The second stage of the operation consists in refluxing for about 8 hours the beta-beta-bis-[4-hydroxy-phenyl]-propane—acetone condensation product obtained as above described, or by any suitable method, with about 20% by weight of a 40% solution of formaldehyde (0.25–0.35 mol formaldehyde per mol of phenol employed in producing the said beta-beta-bis-[4-hydroxy-phenyl]-propane—acetone condensation product). At the end of the reaction period designated, the water and any excess formaldehyde are removed by distilling the mixture in vacuo to a liquid temperature of approximately 200° C. The resulting resin is found to have a melting point of approximately 100–110° C. and to be substantially oil soluble.

A somewhat less desirable procedure consists in refluxing the beta-beta-bis-[4-hydroxy-phenyl]-propane—acetone condensation product with approximately 50% by weight of a 40% solution of formaldehyde until the melting point of a sample of the reaction mixture is found to be about the desired value. For most purposes it has been found that a product having a melting point of about 110° C. gives very satisfactory results for use as an oil-soluble resin. To obtain such a product usually requires about 8–12 hours refluxing. In order to determine when the reaction has progressed sufficiently, a sample of the reaction product is placed in a test tube and heated to approximately 250° C. and the melting point of the resulting product then determined. When, as a result of this test or other means, it is found that the melting point of the resin is about 100° C., or other suitable temperature if such a product is desired, the excess formaldehyde and the water are removed by distilling the reaction mixture to a liquid temperature of approximately 230° C. During this distillation process the melting point of the resin has generally been found to increase about 10° C. when working with about one pound of resin. If, however, the distillation is carried out in vacuo there is generally little if any, increase in the melting point of the resin.

A resin of the same general character may also be obtained by using lesser amounts of formaldehyde in the reaction mixture, provided methanol or other suitable material is employed as a solvent for the reactants, and catalysts such as hydrochloric acid are used. The materials obtained by such a procedure, however, are usually somewhat darker in color than the resin made by the procedure outlined above.

When hydrochloric acid is used as a catalyst, it is not necessary to use such a large excess of formaldehyde as is the case when no catalyst is employed. When using a catalyst it is advisable to heat the intermediate material with the aldehyde until the solution is homogeneous before adding the catalyst.

Although the most desirable form of oil-soluble resins appear to be produced when reacting approximately 0.25–0.35 mol of formaldehyde per mol of phenol employed in producing the beta-beta-bis-[4-hydroxy-phenyl]-propane—acetone condensation product, an oil-soluble resin of satisfactory properties may, as indicated above, be obtained by using proportions of aldehyde somewhat different from the amount just stated. To obtain an oil-soluble product, however, it is generally necessary to react less than 0.5 mol of formaldehyde per mol of phenol employed in producing the acetone-phenol-acetone condensation product and for most purposes better results are produced when staying within the limit of 0.1–0.4 mol.

An alkaline catalyst may also be employed, if desired. The use of either an acid or alkaline catalyst, however, presents some disadvantages due to the fact that the resins produced under such conditions are generally darker than similar products formed without the aid of catalysts. For this reason it is generally preferred to use an excess of formaldehyde without a catalyst.

In the second stage of reaction from 0.25-0.35 mol of formaldehyde reacts per mol of phenol employed in producing the beta-beta-bis-[4-hydroxy-phenyl]-propane—acetone product. While the exact composition of the material formed by the reaction is not definitely known, it appears to consist of molecules of beta-beta-bis-[4-hydroxy-phenyl]-propane — acetone condensation product joined by methylene groups (—CH$_2$—) from the formaldehyde.

The time and temperature of reaction and the amount of formaldehyde reacted during this stage of the operation determine the melting point of the final resin. By reacting greater proportions of formaldehyde, the final product will have a higher melting point and greatly decreased oil-solubility. For this reason, it is highly desirable to stop the refluxing and remove the excess formaldehyde from the mixture at such a point as to give a resin of the desired properties.

Resin prepared as described in the example cited above, is very light in color, soluble in drying oils such as China wood oil, and has melting points ranging from 80° to 140° C., depending upon the amounts of formaldehyde reacted and the period of the reaction. The resins with the lower melting points are the more easily soluble in drying oils but do not accelerate the drying of varnishes as much as similar materials with higher melting points. For use in varnishes it is generally advisable to stop the reaction at a point where a resin having a melting point of 105–115° C., and preferably not above 125° C., is obtained, such resins being substantially completely oil-soluble and at the same time give dry films in less than four hours in a 30-gallon varnish.

The process set forth above is generally applicable to the preparation of resinous condensation products from ketones, phenolic bodies and aldehydes. In place of acetone, other ketones such as methyl ethyl ketone, methyl propyl ketone, ethyl propyl ketone, etc., may be substituted. For phenol there may of course be substituted its homologues such as the cresols and in the appended claims the term "phenol" is used as including both phenol and cresols. Instead of formaldehyde used in the specific example, one may substitute other aldehydes such as acetaldehyde, propionaldehyde, butyraldehyde, etc. Specific examples of such resins produced by the same general method disclosed above and having desirable properties which make them suitable for use in oil varnishes and for other purposes are: beta-beta-bis-[4-hydroxy-phenyl]-propane—acetone butyraldehyde resin, beta-beta-bis-[4-hydroxy-cresyl]-propane — acetone—formaldehyde resin, gamma-gamma - bis-[4-hydroxy-phenyl]-pentane — diethylketone — formaldehyde resin, etc.

What is claimed is:

1. In a process of producing oil-soluble synthetic resins, the step which comprises reacting bis-[4-hydroxy-aryl]-dialkyl methane — ketone condensation products with less than 0.5 mol of an aldehyde per mol of phenol reacted in producing said bis-[4-hydroxy-aryl]-dialkyl methane—ketone condensation product, at the refluxing temperature of the mixture.

2. In a process of producing oil-soluble synthetic resins, the step which comprises reacting bis-[4-hydroxy-aryl]-dialkyl methane — ketone condensation products with approximately 0.25–0.35 mol of an aldehyde per mol of phenol reacted in producing said bis-[4-hydroxy-aryl]-dialkyl methane—ketone condensation product, at the refluxing temperature of the mixture.

3. In a process of producing an oil-soluble synthetic resin, the step which comprises reacting beta-beta-bis-[4-hyroxy-phenyl]-propane—acetone condensation product with less than 0.5 mol of an aldehyde per mol of phenol reacted in producing said beta-beta-bis-[4-hydroxy-phenyl]-propane—acetone condensation product, at the refluxing temperature of the mixture.

4. In a process of producing an oil-soluble synthetic resin, the step which comprises reacting beta-beta-bis-[4 - hydroxy - phenyl] - propane—acetone condensation product with approximately 0.25–0.35 mol of formaldehyde per mol of phenol reacted in producing said beta-beta-bis-[4-hydroxy-phenyl]-propane—acetone condensation product, at the refluxing temperature of the mixture.

5. In a process of producing oil-soluble synthetic resins, the steps which comprise reacting bis-[4-hydroxy-aryl]-dialkyl methane—ketone condensation products with less than 0.5 mol of an aldehyde per mol of phenol reacted in producing said bis-[4-hydroxy-aryl]-dialkyl methane—ketone condensation products, at the refluxing temperature of the mixture, and removing the excess aldehyde and the water.

6. As a new composition of matter, a substantially oil-soluble resin produced by the interaction of one mol of a bis-[4-hydroxy-aryl]-dialkyl methane—ketone condensation product with less than 0.5 mol of an aldehyde per mol of phenol reacted in producing said bis-[4-hydroxy-aryl]-dialkyl methane—ketone condensation product.

7. As a new composition of matter, a substantially oil-soluble resin produced by the interaction of one mol of a bis-[4-hydroxy-aryl]-dialkyl methane—ketone condensation product with less than 0.5 mol of formaldehyde per mol of phenol reacted in producing said bis-[4-hydroxy-aryl]-dialkyl methane—ketone condensation product.

8. As a new composition of matter, a substantially oil-soluble resin produced by the interaction of one mol of beta-beta-bis-[4-hydroxy-phenyl]-propane—acetone condensation product with less than 0.5 mol of an aldehyde per mol of phenol reacted in producing said beta-beta-bis-[4-hydroxy-phenyl]-propane—acetone condensation product.

9. As a new composition of matter, a substantially oil-soluble resin melting at not in excess of about 125° C., produced by the interaction of one mol of beta-beta-bis-[4-hydroxy-phenyl]-propane—acetone condensation product with approximately 0.25–0.35 mol of formaldehyde per mol of phenol reacted in producing said beta-beta - bis-[4 - hydroxy - phenol] - propane—acetone condensation product.

10. In a process of producing oil-soluble synthetic resins, the step which comprises reacting a bis-[hydroxy-aryl]-dialkyl methane — ketone condensation product with less than 0.5 mol of an aldehyde per mol of phenol reacted in producing said bis-[hydroxy-aryl]-dialkyl methane—ketone condensation product, at the refluxing temperature of the mixture.

11. As a new composition of matter, a substantially oil-soluble resin produced by the interaction of one mol of a bis-[hydroxy-aryl]-dialkyl methane—ketone condensation product with less than 0.5 mol of an aldehyde per mol of phenol reacted in producing said bis-[hydroxy-aryl]-dialkyl methane—ketone condensation product.

KENNETH M. IREY.

CERTIFICATE OF CORRECTION.

Patent No. 1,970,912.  August 21, 1934.

KENNETH M. IREY.

It is hereby certified that error appears in the printed specification of the above numbered patent requiring correction as follows: Page 1, line 19, for "ordinary" read ordinarily; line 44, for "keton" read ketone; and line 83, after "so" insert the word as; page 2, line 58, for "acetone-phenol-" read beta.beta.bis-(4-hydroxy-phenyl)-propane—; and that the said Letters Patent should be read with these corrections therein that the same may conform to the record of the case in the Patent Office.

Signed and sealed this 16th day of October, A. D. 1934.

Leslie Frazer (Seal)  Acting Commissioner of Patents.

producing said beta-beta-bis-[4-hydroxy-phenyl]-propane—acetone condensation product, at the refluxing temperature of the mixture.

4. In a process of producing an oil-soluble synthetic resin, the step which comprises reacting beta-beta-bis-[4 - hydroxy - phenyl] - propane—acetone condensation product with approximately 0.25–0.35 mol of formaldehyde per mol of phenol reacted in producing said beta-beta-bis-[4-hydroxy-phenyl]-propane—acetone condensation product, at the refluxing temperature of the mixture.

5. In a process of producing oil-soluble synthetic resins, the steps which comprise reacting bis-[4-hydroxy-aryl]-dialkyl methane—ketone condensation products with less than 0.5 mol of an aldehyde per mol of phenol reacted in producing said bis-[4-hydroxy-aryl]-dialkyl methane—ketone condensation products, at the refluxing temperature of the mixture, and removing the excess aldehyde and the water.

6. As a new composition of matter, a substantially oil-soluble resin produced by the interaction of one mol of a bis-[4-hydroxy-aryl]-dialkyl methane—ketone condensation product with less than 0.5 mol of an aldehyde per mol of phenol reacted in producing said bis-[4-hydroxy-aryl]-dialkyl methane—ketone condensation product.

7. As a new composition of matter, a substantially oil-soluble resin produced by the interaction of one mol of a bis-[4-hydroxy-aryl]-dialkyl methane—ketone condensation product with less than 0.5 mol of formaldehyde per mol of phenol reacted in producing said bis-[4-hydroxy-aryl]-dialkyl methane—ketone condensation product.

8. As a new composition of matter, a substantially oil-soluble resin produced by the interaction of one mol of beta-beta-bis-[4-hydroxy-phenyl]-propane—acetone condensation product with less than 0.5 mol of an aldehyde per mol of phenol reacted in producing said beta-beta-bis-[4-hydroxy-phenyl]-propane—acetone condensation product.

9. As a new composition of matter, a substantially oil-soluble resin melting at not in excess of about 125° C., produced by the interaction of one mol of beta-beta-bis-[4-hydroxy-phenyl]-propane—acetone condensation product with approximately 0.25–0.35 mol of formaldehyde per mol of phenol reacted in producing said beta-beta - bis-[4 - hydroxy - phenol] - propane—acetone condensation product.

10. In a process of producing oil-soluble synthetic resins, the step which comprises reacting a bis-[hydroxy-aryl]-dialkyl methane — ketone condensation product with less than 0.5 mol of an aldehyde per mol of phenol reacted in producing said bis-[hydroxy-aryl]-dialkyl methane—ketone condensation product, at the refluxing temperature of the mixture.

11. As a new composition of matter, a substantially oil-soluble resin produced by the interaction of one mol of a bis-[hydroxy-aryl]-dialkyl methane—ketone condensation product with less than 0.5 mol of an aldehyde per mol of phenol reacted in producing said bis-[hydroxy-aryl]-dialkyl methane—ketone condensation product.

KENNETH M. IREY.

CERTIFICATE OF CORRECTION.

Patent No. 1,970,912.  August 21, 1934.

KENNETH M. IREY.

It is hereby certified that error appears in the printed specification of the above numbered patent requiring correction as follows: Page 1, line 19, for "ordinary" read ordinarily; line 44, for "keton" read ketone; and line 83, after "so" insert the word as; page 2, line 58, for "acetone-phenol-" read beta.beta-bis-(4-hydroxy-phenyl)-propane—; and that the said Letters Patent should be read with these corrections therein that the same may conform to the record of the case in the Patent Office.

Signed and sealed this 16th day of October, A. D. 1934.

Leslie Frazer (Seal)  Acting Commissioner of Patents.